US011041100B2

(12) United States Patent
Vinci et al.

(10) Patent No.: US 11,041,100 B2
(45) Date of Patent: *Jun. 22, 2021

(54) TWO-COMPONENT SOLVENTLESS ADHESIVE COMPOSITIONS COMPRISING AN AMINE-INITIATED POLYOL

(71) Applicant: Dow Global Technologies LLC, Midland, MI (US)

(72) Inventors: Daniele Vinci, Horgen (CH); Thorsten Schmidt, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/300,559

(22) PCT Filed: Apr. 25, 2017

(86) PCT No.: PCT/US2017/029295
§ 371 (c)(1),
(2) Date: Nov. 10, 2018

(87) PCT Pub. No.: WO2017/196530
PCT Pub. Date: Nov. 16, 2017

(65) Prior Publication Data
US 2019/0390095 A1 Dec. 26, 2019

(30) Foreign Application Priority Data

May 10, 2016 (IT) .................... 102016000047936

(51) Int. Cl.
| | | |
|---|---|---|
| *C09J 175/12* | (2006.01) | |
| *C09J 5/04* | (2006.01) | |
| *C08G 18/38* | (2006.01) | |
| *B32B 27/40* | (2006.01) | |
| *C08G 18/76* | (2006.01) | |

(52) U.S. Cl.
CPC ............ *C09J 175/12* (2013.01); *B32B 27/40* (2013.01); *C08G 18/3819* (2013.01); *C08G 18/7614* (2013.01); *C08G 18/7671* (2013.01); *C09J 5/04* (2013.01); *C09J 2475/00* (2013.01)

(58) Field of Classification Search
None
See application file for complete search history.

(56) References Cited

U.S. PATENT DOCUMENTS

| | | | | |
|---|---|---|---|---|
| 3,840,419 | A * | 10/1974 | De Keyser | .............. B32B 27/00 |
| | | | | 156/307.3 |
| 4,342,613 | A | 8/1982 | O'Leary et al. | |
| 5,614,575 | A * | 3/1997 | Kotschwar | ........... C08G 18/482 |
| | | | | 524/270 |
| 2002/0111410 | A1* | 8/2002 | Lewno | .............. B32B 17/10036 |
| | | | | 524/425 |
| 2010/0297427 | A1 | 11/2010 | Schlingloff et al. | |
| 2015/0096503 | A1 | 4/2015 | Dugan et al. | |
| 2016/0090515 | A1 | 3/2016 | Roock et al. | |
| 2019/0177575 | A1* | 6/2019 | Wu | .......................... B32B 5/024 |
| 2019/0202172 | A1* | 7/2019 | Schmidt | .................. B32B 5/022 |
| 2019/0284456 | A1* | 9/2019 | Wu | ...................... C08G 18/71 |
| 2019/0390094 | A1* | 12/2019 | Wu | .................... C08G 18/6685 |

FOREIGN PATENT DOCUMENTS

| | | |
|---|---|---|
| DE | 2705751 B1 | 7/1978 |
| WO | WO-0071343 A1 * 11/2000 | ......... B32B 37/1207 |
| WO | 2016/025234 A1 | 2/2016 |

OTHER PUBLICATIONS

IUPAC entry for "alkyl group" doi:10.1351/goldbook.A00228 (Year: 2014).*
IUPAC entry for "alkyl radicals" doi:10.1351/goldbook.A00235 (Year: 2014).*
IUPAC entry for "alkylenes" doi:10.1351/goldbook.A00227 (Year: 2014).*
PCT/US2017/029295, International Search Report and Written Opinion dated Jun. 27, 2017.
PCT/US2017/029295, International Preliminary Report on Patentability dated Nov. 22, 2018.

* cited by examiner

*Primary Examiner* — Michael J Feely
(74) *Attorney, Agent, or Firm* — William R. Hales

(57) ABSTRACT

Two-component solventless polyurethane adhesive compositions comprising an isocyanate component and a polyol component comprising at least one highly-reactive amine-initiated polyol are disclosed. The at least one amine-initiated polyol comprises primary hydroxyl groups and a backbone incorporating one or more tertiary amines. The amine-initiated polyol further comprises a functionality of from 2 to 12, a hydroxyl number of from 5 to 1,830, and a viscosity at 40° C. of from 500 to 20,000 mPa-s. The polyol component can further comprise a non-amine-initiated polyol. The adhesive compositions are formulated such that the isocyanate and polyol components can be applied to separate substrates prior to mixing. Still further, a laminate comprising the adhesive compositions is disclosed.

13 Claims, 1 Drawing Sheet

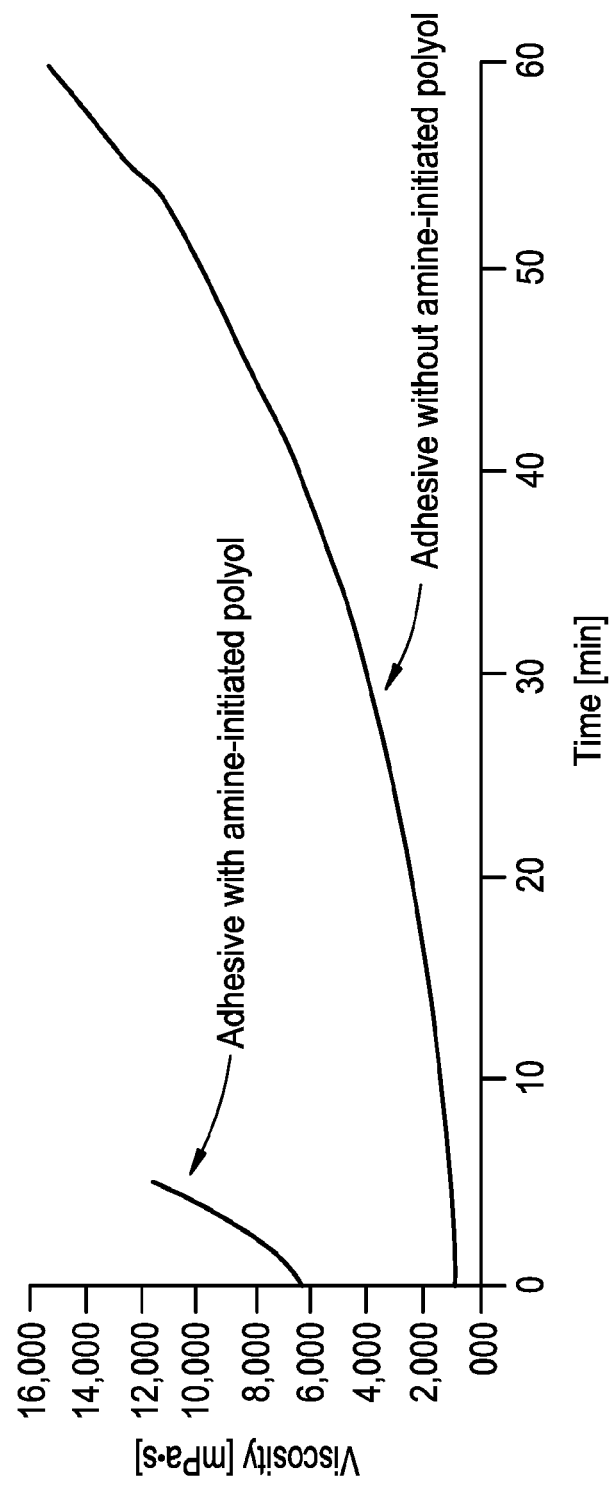

TWO-COMPONENT SOLVENTLESS ADHESIVE COMPOSITIONS COMPRISING AN AMINE-INITIATED POLYOL

REFERENCE TO RELATED APPLICATIONS

The present application claims the benefit of Italy Application No. 102016000047936, filed on May 10, 2016.

FIELD OF THE DISCLOSURE

The instant disclosure relates to solventless adhesive compositions. More particularly, the disclosure relates to two-component solventless polyurethane adhesive compositions for use in laminated structures. The disclosed adhesive compositions comprise amine-initiated polyols providing for laminate structures having improved conversion efficiency.

In some embodiments, the adhesive compositions exhibit high reactivity and, thus, are formulated to be applied to two substrates independently which are then brought together to mix and react the adhesive composition. In particular, one component of the adhesive composition is configured to be uniformly applied to a surface of a first substrate and the other component of the adhesive composition is configured to be applied to a surface of a second substrate. The first and second substrates are subsequently brought together, thereby mixing and reacting the two components to form an adhesive between the first and second substrates. In this way, the adhesive can then be cured, thereby bonding the first and second substrates.

BACKGROUND OF THE DISCLOSURE

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Solventless laminating adhesives can be applied up to one hundred percent solids without either organic solvent or an aqueous carrier. Because no organic solvent or water has to be dried from the adhesive upon application, these adhesives can be run at high line speeds and are preferable in applications requiring quick adhesive application. Solvent and water-based laminating adhesives are limited by the rate at which the solvent or water can be effectively dried and removed from the laminate structure after application of the adhesive. For environmental, health, and safety reasons, laminating adhesives are preferably aqueous or solventless.

Within the category of solventless laminating adhesives, there are many varieties. One particular variety includes premixed, two-component, polyurethane-based laminating adhesives. Typically, a two-component polyurethane-based laminating adhesive includes a first component comprising an isocyanate-containing prepolymer and/or a polyisocyanate and a second component comprising a polyol. The prepolymer can be obtained by the reaction of excess isocyanate with a polyether and/or polyester containing two or more hydroxyl groups per molecule. The second component comprises a polyether and/or polyester initiated with two or more hydroxyl groups per molecule. The two components are combined in a predetermined ratio, or "premixed," and then applied on a first substrate ("carrier web"). The first substrate is then brought together with a second substrate to form a laminate structure.

Additional layers of substrate can be added to the structure with additional layers of adhesive composition located between each successive substrate. The adhesive is then cured, either at room temperature or elevated temperature, thereby bonding the substrates together.

Further processing of the laminate structure depends upon the curing speed of the adhesive. The curing speed of the adhesive is indicated by the time in which the mechanical bond between the laminated substrates takes to become sufficient to allow for further processing and the laminate is in compliance with applicable regulations (e.g., food contact regulations). Slow curing speed results in lower conversion efficiency. Premixed two-component solventless laminating adhesives, compared to traditional solvent-containing adhesives, exhibit weak initial bonds and slow curing speed. The general trend in the converting industry is towards faster curing laminating adhesives. Faster curing improves the operational efficiency for converters. Specifically, quickly moving finished products out of a warehouse increases production capacity and flexibility for handling last minute orders (e.g., retailer promotional campaigns). In order to increase operational efficiency, an adhesive composition with a reactivity much higher than existing adhesive compositions should be used to form laminates. However, such an adhesive composition would provide a challenge for traditional adhesive application technologies.

Accordingly, two-component solventless polyurethane-based laminating adhesive compositions with improved bond strength and faster curing speeds are desirable.

SUMMARY OF THE DISCLOSURE

Two-component solventless polyurethane adhesive compositions are disclosed. In some embodiments, the solventless adhesive composition includes an isocyanate component including at least one isocyanate. The solventless adhesive composition further includes a polyol component including at least one highly-reactive amine-initiated polyol. The at least one isocyanate can be selected from the group consisting of an aromatic isocyanate, an aliphatic isocyanate, and combinations thereof. The amine-initiated polyol can further comprise a functionality of from about 2 to about 12, a hydroxyl number of from about 5 to about 1,830, and a molecular weight of from about 500 to about 20,000. Upon combining the isocyanate and polyol components, thereby forming the adhesive composition, the adhesive composition can exhibit a viscosity greater than 10,000 mPa-s (at 40° C.) within 10 minutes. The polyol component can further include a non-amine-initiated polyol.

The disclosed adhesive compositions exhibit fast curing rates relative to existing two-component solventless adhesive compositions. As a result, laminated structures comprising the adhesive compositions can be slit within as little as two hours after lamination and delivered within two days to a customer. Laminates comprising existing general purpose adhesive compositions typically require two to three days from lamination for slitting and five to seven days for delivery. Accordingly, the process efficiencies are greatly improved using the disclosed adhesive compositions. In addition, the pot-life of the disclosed adhesive compositions is indefinite compared to a twenty to thirty minute pot-life for existing general purpose adhesives. This is because the pot-life of the disclosed adhesive compositions is completely decoupled from the curing process, as will be discussed below.

Because the disclosed adhesive compositions are formulated to be more highly reactive and exhibit faster curing rates than existing adhesive compositions, they are not ideally suited for use with existing adhesive application apparatuses. This is because the two components react very quickly, causing the adhesive to gel and be unfit for application to a substrate. For this reason, the disclosed adhesive compositions are formulated such that the isocyanate and polyol components are applied separately on two different substrates, instead of being premixed and applied on a carrier web.

In particular, the disclosed adhesive compositions are formulated such the isocyanate component can be uniformly applied to a surface of a first substrate and the polyol component can be applied to a surface of a second substrate. The surface of the first substrate is then brought into contact with the surface of the second substrate to mix and react the two components, thereby forming a laminate. The adhesive composition is then curable.

BRIEF DESCRIPTION OF THE DRAWING

Reference is made to the accompanying drawing in which:

FIG. 1 is a plot illustrating the viscosity of adhesive compositions versus time.

DETAILED DESCRIPTION OF THE DISCLOSURE

The two-component solventless adhesive composition according to this disclosure comprises an isocyanate component and a polyol component, as stated above.

Isocyanate Component

The isocyanate component comprises at least one isocyanate. The at least one isocyanate can be selected from the group consisting of an isocyanate prepolymer, an isocyanate monomer, a polyisocyanate (e.g., dimers, trimmers, etc.), and combinations of two or more thereof. As used herein, a "polyisocyanate" is any compound that contains two or more isocyanate groups. The isocyanate prepolymer is the reaction product of reactants comprising at least one isocyanate and at least one polyol. As used herein, the "isocyanate prepolymer" can be a polyisocyanate itself.

The at least one isocyanate comprises a functionality of from 1.5 to 10, or from 1.8 to 5, or from 2 to 3. As used with respect to the isocyanate component, "functionality" refers to the number of hydroxyl reactive sites per molecule. Compounds having isocyanate groups, such as the isocyanate component, may be characterized by the parameter "% NCO," which is the amount of isocyanate groups by weight based on the weight of the compound. The parameter % NCO is measured by the method of ASTM D 2572-97 (2010). The disclosed isocyanate component has a % NCO of at least 3%, or at least 6%, or at least 10%. Preferably the isocyanate component has a % NCO not to exceed 25%, or 18%, or 14%.

Further, the at least one isocyanate comprises a free monomer content of from 0 to 50%, or from 5 to 40%, or from 10 to 30%. Still further, the at least one isocyanate comprises a molecular weight of from 200 to 3,000 g/mol, or from 300 to 2,000 g/mol, or from 500 to 1,000 g/mol. Even further, the isocyanate component has viscosity at 25° C. of from 300 to 40,000 mPa-s, or from 500 to 20,000 mPa-s, or from 1,000 to 10,000 mPa-s, as measured by the method of ASTM D2196.

The at least one isocyanate of the isocyanate component can be selected from the group consisting of an aromatic isocyanate, an aliphatic isocyanate, a cycloaliphatic isocyanate, and combinations thereof. An "aromatic polyisocyanate" is an isocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Examples of aromatic isocyanates suitable for use according to the disclosure include, but are not limited to, isomers of methylene diphenyl diisocyanate ("MDI"), such as 4,4-MDI, 2,2-MDI and 2,4-MDI, isomers of toluene-diisocyanate ("TDI") such as 2,4-TDI, 2,6-TDI, isomers of naphthalene-diisocyanate ("NDI") such as 1,5-NDI, isomers of norbornane diisocyanate ("NBDI"), isomers of tetramethylxylylene diisocyanate ("TMXDI"), and combinations of two or more thereof. Preferred are isomers of MDI, particularly a mixture of 4,4-MDI and 2,4-MDI (i.e., liquid MDI) or 4,4-MDI (i.e., solid MDI).

Examples of aliphatic and cycloaliphatic isocyanates suitable for use according to the disclosure include, but are not limited to, isomers of hexamethylene diisocyanate ("HDI"), isomers of isophorone diisocyanate ("IPDI"), isomers of xylene diisocyanate ("XDI"), and combinations thereof.

The amount of the at least one isocyanate in the adhesive composition is, by weight based on the weight of the adhesive composition (i.e., the total weight of the isocyanate component and the polyol component), at least 5 wt %, or at least 10 wt %, or at least 20 wt %. The amount of the at least one isocyanate in the adhesive composition is, by weight based on the weight of the adhesive composition, not to exceed 100 wt %, or not to exceed 95 wt %, or not to exceed 90 wt %.

The isocyanate component can further comprise other constituents commonly known to those of ordinary skill in the art.

Polyol Component

The solventless adhesive composition further comprises a polyol component comprising at least one highly-reactive amine-initiated polyol. Inclusion of the at least one amine-initiated polyol in the polyol component provides for higher reactivity and faster curing than traditional polyols used in existing two component solventless adhesive compositions. The amine-initiated polyol comprises primary hydroxyl groups and a backbone incorporating at least one tertiary amine. In some embodiments, the polyol component can also comprise another type of polyol which is a non-amine-initiated polyol. Each polyol type may include one kind of polyol. Alternatively, each polyol type may include mixtures of different kinds of polyols. In some embodiments, one polyol type may be one kind of polyol whereas the other polyol type may be a mixture of different kinds of polyols.

The amine-initiated polyol comprises primary hydroxyl groups and a backbone incorporating at least one tertiary amine. In some embodiments, the amine-initiated polyol has the chemical structure of I:

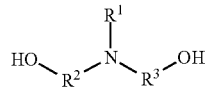

I wherein $R^1$, $R^2$, and $R^3$ are each independently a linear or branched alkyl group. For instance, can each independently be a $C_1$-$C_6$ linear or branched alkyl group. In some embodiments, the amine-initiated polyol comprises tertiary amines and secondary amines.

The at least one amine-initiated polyol comprises a functionality of from 2 to 12, or from 3 to 10, or from 4 to 8. As used with respect to the polyol component, "functionality" refers to the number of isocyanate reactive sites per molecule. Further, the at least one amine-initiated polyol comprises a hydroxyl number of from 5 to 1,830, or from 20 to 100, or from 31 to 40. As used with respect to the polyol component, "hydroxyl number" is a measure of the amount of reactive hydroxyl groups available for reaction. This number is determined in a wet analytical method and is reported as the number of milligrams of potassium hydroxide equivalent to the hydroxyl groups found in one gram of the sample. The most commonly used methods to determine hydroxyl number are described in ASTM D 4274 D. Still further, the at least one amine-initiated polyol comprises a viscosity at 25° C. of from 500 to 20,000 mPa-s, or from 1,000 to 15,000 mPa-s, or from 1,500 to 10,000 mPa-s.

Amine-initiated polyols suitable for use according to this disclosure are made by alkoxylating one or more amine initiators with one or more alkylene oxides.

The amount of the at least one amine-initiated polyol in the adhesive composition is, by weight based on the weight of the adhesive composition (i.e., the total weight of the isocyanate component and the polyol component), at least 2 wt %, or at least 10 wt %, or at least 20 wt %. The amount of the at least one amine-initiated polyol in the adhesive composition is, by weight based on the weight of the adhesive composition, not to exceed 100 wt %, or not to exceed 95 wt %, or not to exceed 90 wt %.

In some embodiments, at least one non-amine-initiated polyol may optionally be included in the adhesive composition, e.g., in the polyol component. Examples of the non-amine-initiated polyol include, but are not limited to, polyester polyols, polyether polyols, polycarbonate polyols, polyacrylate polyols, polycaprolactone polyols, polyolefin polyols, natural oil polyols, and combinations of two or more thereof. Preferably the non-amine-initiated polyol has viscosity at 25° C. of from 30 to 40,000 mPa-s, or from 50 to 30,000 mPa-s, or from 70 to 20,000 mPa-s, as measured by the method of ASTM D2196. Preferably the non-amine-initiated polyol has viscosity of 100 to 10,000 mPa-s at 25° C., as measured by the method of ASTM D2196.

The amount of the at least one non-amine-initiated polyol in the adhesive composition is at least 0 wt %, or at least 5 wt %, or at least 10 wt %. The amount of the at least one non-amine-initiated polyol in the adhesive composition is not to exceed 98 wt %, or not to exceed 90 wt %, or not to exceed 80 wt %.

The mix ratio of the isocyanate component to the polyol component, by weight, is controlled by adjusting the coating weight of each component to its respective substrate. In some embodiments, the mix ratio of the isocyanate component to the polyol component in the final adhesive composition can be 100:100, or 100:90, or 100:80. The disclosed adhesive compositions are more forgiving than traditional adhesives and can accommodate some coating weight error (e.g., up to about 10% coating weight error).

In some embodiments, one or more additives can optionally be included in the adhesive composition. Examples of such additives include, but are not limited to, tackifiers, plasticizers, rheology modifiers, adhesion promoters, antioxidants, fillers, colorants, surfactants, solvents, and combinations of two or more thereof.

The polyol component can further comprise other constituents commonly known to those of ordinary skill in the art, e.g., additional polyols, isocyanates, etc.

Laminate Formation

It is contemplated that the isocyanate component and the polyol component of the disclosed solventless adhesive composition are formulated separately and stored until it is desired to form a laminate structure. Preferably, the isocyanate component and polyol component are in a liquid state at 25° C. Even if the components are solid at 25° C., it is acceptable to heat the components as necessary to put them into a liquid state. As the pot-life of the adhesive composition is decoupled from the curing process, the components can be stored indefinitely.

A laminate comprising the disclosed adhesive compositions can be formed by applying the isocyanate and polyol components of the adhesive composition separately to two different substrates, such as two films. As used herein, a "film" is any structure that is 0.5 mm or less in one dimension and is 1 cm or more in both of the other two dimensions. A "polymer film" is a film that is made of a polymer or mixture of polymers. The composition of a polymer film is, typically, 80 percent by weight or more by weight one or more polymers.

For instance, a layer of the isocyanate component is applied to a surface of a first substrate. Preferably, the thickness of the layer of the isocyanate component on the first substrate is from 0.5 to 2.5 μm. A layer of the polyol component is applied to a surface of a second substrate. Preferably, the thickness of the layer of the polyol component on the second substrate is from 0.5 to 2.5 μm. By controlling the thickness of the layers applied to each substrate, the ratio of the components can be controlled.

The surfaces of the first and second substrates are then run through a device for applying external pressure to the first and second substrates, such as nip roller. Bringing the isocyanate component and polyol component together forms a curable adhesive mixture layer. When the surfaces of the first and second substrates are brought together, the thickness of the curable adhesive mixture layer is 1 to 5 μm. The isocyanate component and polyol component begin mixing and reacting when the first and second substrates are brought together and the components come into contact with each other. This marks the beginning of the curing process.

Further mixing and reacting is accomplished as the first and second substrates are run through various other rollers and ultimately to a rewind roller. The further mixing and reacting occurs as the first and second substrates pass through rollers because the substrates each take longer or shorter paths than the other substrate across each roller. In this way, the two substrates move relative to one another, mixing the components on the respective substrates. Arrangements of such rollers in an application apparatus are commonly known in the art. The curable mixture is then cured or allowed to cure.

Suitable substrates in the laminate structure include films such as paper, woven and nonwoven fabric, metal foil, polymer films, and metal-coated polymer films. Some films optionally have a surface on which an image is printed with ink which may be in contact with the adhesive composition. The substrates are layered to form a laminate structure, with an adhesive composition according to this disclosure adhering one or more of the substrates together.

Turning now to FIG. 1, a plot showing the reactivity profiles of an adhesive composition according to the present disclosure, i.e., comprising a disclosed amine-initiated polyol, and that of an adhesive composition without an amine-initiated polyol are shown. In FIG. 1, the adhesive composition comprising an amine-initiated polyol initially comprises a viscosity at 40° C. of approximately 6,000 mPa-s at the time of lamination. Surprisingly, the viscosity increases rapidly to greater than 10,000 mPa-s in less than ten minutes after lamination. Conversely, the adhesive composition without an amine-initiated polyol initially comprises a viscosity at 40° C. of approximately 1,000 mPa-s at the time of lamination. The viscosity does not exceed 10,000 mPa-s until approximately fifty minutes after lamination. This reactivity profile is typical of existing solventless adhesive compositions.

Accordingly, inclusion of a disclosed amine-initiated polyol in the polyol component of the adhesive composition provides for an adhesive composition with a significantly faster reactivity profile. Such adhesive compositions are particularly suited for lamination according to the methods disclosed herein.

Examples of the Disclosure

The present disclosure will now be explained in further detail by describing examples illustrating the disclosed adhesive compositions and existing adhesive compositions (collectively, "the Examples"). However, the scope of the present disclosure is not, of course, limited to the Examples.

In the Examples, the isocyanate component comprises aromatic isocyanates commonly known to those of ordinary skill in the art, e.g., TDI MDI. The polyol components of the Examples are prepared according to the formulations listed in Table 1, below:

TABLE 1

| | | OH Component Sample Formulations | | | | | | |
|---|---|---|---|---|---|---|---|---|
| Component | Chemical Nature | E1 (wt %) | E2 (wt %) | E3 (wt %) | E4 (wt %) | E5 (wt %) | E6 (wt %) | E7 (wt %) |
| A | Polyol | | 61 | 73 | | 75 | 74 | |
| B | Polyol | 55 | | | 54 | | | 55 |
| C | Polyol | | 15 | | | | | |
| D | Polyol | | 20 | | | | | |
| E | Polyol | | 4 | 2 | | 2 | 2 | |
| F | Polyol | | | | 8 | 5 | | |
| G | Amine-Initiated Polyol | 11 | | 20 | 20 | 10 | 10 | 11 |
| H | Polyester | | | | | | 8 | |
| I | Polyester | | | | | | | 16 |
| J | Polyester | 16 | | | | | | |
| K | Polyester | 8 | | | 8 | | | 8 |
| L | Aromatic Isocyanate | 10 | | 5 | 10 | 8 | 6 | 10 |
| | OH Number | 149 | 226 | 128 | 136 | 128 | 130 | 142 |

Laminate structures comprising the polyol components described in Table 1 are prepared on a Nordmeccanica LABO COMBI™ laminator. The prepared laminate structures are then tested for bond strength and primary aromatic amine decay on the LABO COMBI™ laminator. The bond strength of the laminate structures is tested according to ASTM F904. The primary aromatic amine decay analysis is a test for the determination of primary aromatic amines in aqueous food stimulants (3% acetic acid). The test is based on the official BrF Method No. L 00-00.6 and Commission Regulation (EU) No. 10/2011.

Performance results are shown in Table 2, below. Bond strength is measured according to ASTM F904 at 2 hours, 4 hours, 1 day, and 2 days after lamination. Primary aromatic amine decay is tested according to BrF Method No. L 00-00.6 and Commission Regulation (EU) No. 10/2011 at 24 hours, 2 days, and 3 days after lamination.

TABLE 2

Performance Results on LABO COMBI™

| OH Component Sample | Laminate Structure | Bond Strength (N/15 mm) | | | | PAA decay (μg/100 mL) | | |
| --- | --- | --- | --- | --- | --- | --- | --- | --- |
| | | 2 hr | 4 hr | 1 day | 2 day | 24 h | 2 d | 3 d |
| E2 | PET-ALU/PE | 0.5 a coex | 2.1 a PE | 4.8 a ALU + WL PE | 4.8 a ALU | 0.6 | <0.2 | — |
| E3 | PET-ALU/PE | 1.6 a coex | 3.5 a PE | 2.5 a PE | 2.1 a PE | 0.4 | 0.3 | — |
| E4 | PET-ALU/PE | 2.4 a PE | 2.5 a PE | 2.1 a PE | 1.9 a PE | 1 | 0.6 | — |
| E5 | PET-ALU/PE | 0.7 a coex | 2.6 a PE | 3.9 a PE | 3.8 a PE | <0.2 | <0.2 | — |
| E6 | PET-ALU/PE | <0.2 a coex | 1.6 a PE | 3.6 a PE | 2.7 a PE | <0.2 | — | — |
| E7 | PET-ALU/PE | 0.7 a coex | 2.9 a PE | 3.0 a PE | 4.1 a PE | 0.24 | 0.34 | — |
| E1 | PET-ALU/PE | 0.9 a coex | 2.3 a PE | 5.2 a PE | 6.0 a coex | 0.24 | <0.2 | — |
| E1 | PET/PE (mix ratio 100/90) | 0.7 a coex | 1.9 a PE | 2.9 t PET | 5.3 t PET | — | 0.23 | <0.2 |
| E1 | PET/PE (mix ratio 100/95) | 0.7 a coex | 1.9 a PE | 2.4 t PET | 4.2 t PET | — | 0.26 | <0.2 |
| E1 | BOPP ink/metPP | 1.4 a BOPP | 1.6 a BOPP | 1.6 a BOPP | 1.7 a BOPP | — | <0.2 | |
| E1 | OPA/PE | 2.2 a coex | 5.0 t PE | 5.7 t + b PE | 6.9 t + b PE | — | 0.5 | 0.5 |
| E1 | PET/PE (mix ratio 100/90) | 0.7 a coex | 1.9 a PE | 2.9 t PET | 5.3 t PET | — | 0.2 | <0.2 |

In Table 2, "a" indicates that the adhesive remains intact, and "t" indicates that one of the laminate structures is torn. Based upon the data in Table 2, inclusion of an amine-initiated polyol increases the reactivity of the adhesive composition. As illustrated in Table 3, the formulations comprising the amine-initiated polyol exhibit faster bond development and faster PAA decay. In particular, full bond development is achieved in two days. Full bond development occurs when all functional groups (e.g., NCO and OH groups) of the at least one isocyanate and polyols have been reacted and integrated into the final polymer chain, i.e., no further crosslinking reaction are ongoing and the final bond performance, thermal and chemical resistance is achieved. However, a bond sufficient to slit the laminate structure is achieved within one hour after lamination using the polyol component comprising the highly-reactive amine-initiated polyol. A laminate structure has a bond sufficient to slit when it has a bond strength of at least 1 N/15 min and a tack-free adhesive.

Laminate structures are also formed on a lamination machine with two coating heads, as envisioned according to this disclosure. The prepared laminate structures are then tested for bond strength and primary aromatic amine decay.

As indicated in Table 3, adhesive compositions including the disclosed amine-initiated polyol surprisingly all achieved bond strengths in excess of 1.0 N/15 min within two hours of laminating. Many of the Examples even exhibited bond strengths in excess of 2.0 N/15 min within two hours of laminating.

What is claimed is:

1. A non-premixed two-component solventless laminating adhesive composition for use in food packaging laminates, comprising:
    an isocyanate component comprising at least one isocyanate comprising a functionality of from 1.5 to 10, the isocyanate component having film forming properties allowing for a uniform film thickness of 0.5 to 2.5 μm when applied to a first substrate; and
    a polyol component comprising at least one amine-initiated polyol comprising primary hydroxyl groups and a backbone incorporating at least one tertiary amine, wherein the at least one amine-initiated polyol comprises a functionality of from 2 to 12, a hydroxyl number of from 5 to 1,830, and a viscosity at 25° C. of from 500 to 20,000 mPa·s, the polyol component having film forming properties allowing for a uniform film thickness of 0.5 to 2.5 μm when applied to a second substrate;

TABLE 3

Performance Results on Two Coating Head Laminator

| OH Component Sample | NCO Component Substrate | OH Component Substrate | Coating Weight/Substrate (g/m²) | Line Speed (m/min) | Bond (N/15 mm) @ 0.5 hr | Bond (N/15 mm) @ 1 hr | Bond (N/15 mm) @ 1.5 hr | Bond (N/15 mm) @ 2 hr |
| --- | --- | --- | --- | --- | --- | --- | --- | --- |
| E2 | PET-ALU | PE | 1.8 | 300 | — | — | — | 0.5 |
| E1 | PET Unprinted | Metallized PP | 1.8 | 300 | 0.13 | 0.47 | 1.1 | 2.0 |
| E1 | Metallized PP | PET Unprinted | 1.8 | 150 | 0.11 | 0.43 | 0.94 | 1.5 |
| E1 | PET-ALU | PE | 1.75 | 300 | 0.15 | 0.37 | 1.4 | 2.1 |
| E1 | PE | ALU-PET | 1.75 | 300 | 0.13 | 0.32 | 1.1 | 2.1 |
| E1 | BOPP Printed | PE | 2 | 300 | 0.11 | 0.27 | 0.93 | 1.5 |
| E1 | PE | BOPP Printed | 1.85 | 150 | 0.11 | 0.21 | 0.61 | 1.0 | wherein the film thicknesses of the components control the mix ratio of components in the adhesive composition when the films are brought together for mixing and reacting, such that the mix ratio of the isocyanate component to the polyol component ranges from 100:100 to 100:80 by weight.

2. The non-premixed two-component solventless laminating adhesive composition of claim 1, wherein the adhesive composition comprises a viscosity greater than 10,000 mPa·s within 10 minutes of mixing the isocyanate component and polyol component.

3. A laminate structure comprising a first substrate, a second substrate, and an adhesive film positioned between said first and second substrates; wherein the adhesive film comprises a mixed and reacted product of the non-premixed two-component solventless laminating adhesive composition according to claim 1.

4. A non-premixed two-component solventless laminating adhesive composition for use in food packaging laminates, comprising:
an isocyanate component comprising at least one isocyanate comprising a functionality of from 1.5 to 10, the isocyanate component having film forming properties allowing for a uniform film thickness of 0.5 to 2.5 μm when applied to a first substrate; and
a polyol component comprising at least one amine-initiated polyol comprising primary hydroxyl groups and a backbone incorporating at least one tertiary amine, the polyol component having film forming properties allowing for a uniform film thickness of 0.5 to 2.5 μm when applied to a second substrate,
wherein the film thicknesses of the components control the mix ratio of components in the adhesive composition when the films are brought together for mixing and reacting, such that the mix ratio of the isocyanate component to the polyol component ranges from 100:100 to 100:80 by weight.

5. The non-premixed two-component solventless laminating adhesive composition of claim 4, wherein the at least one amine-initiated polyol has the structure I:

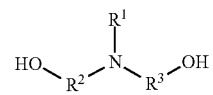

wherein $R^1$, $R^2$, and $R^3$ are independently a linear or branched saturated hydrocarbon group.

6. The non-premixed two-component solventless laminating adhesive composition of claim 4, wherein the at least one amine-initiated polyol comprises a functionality of 4.

7. The non-premixed two-component solventless laminating adhesive composition of claim 4, wherein the at least one amine-initiated polyol comprises a hydroxyl number of 37.

8. The non-premixed two-component solventless laminating adhesive composition of claim 4, wherein the at least one amine-initiated polyol comprises a viscosity at 25° C. of about 1,200 mPa·s.

9. The non-premixed two-component solventless laminating adhesive composition of claim 4, wherein the at least one amine-initiated polyol comprises a molecular weight of about 6,000 g/mol.

10. The non-premixed two-component solventless laminating adhesive composition of claim 4, wherein the mix ratio is 100:100, 100:90 or 100:80 by weight.

11. The non-premixed two-component solventless laminating adhesive composition of claim 4, wherein the isocyanate component comprises less than about 50% monomer content.

12. The non-premixed two-component solventless laminating adhesive composition of claim 4, wherein the isocyanate component comprises a viscosity at 25° C. from 500 to 10,000 mPa·s.

13. The non-premixed two-component solventless laminating adhesive composition of claim 4, wherein the at least one isocyanate is selected from the group consisting of 4,4-methylene diphenyl diisocyanate ("MDI"), 2,4-MDI, 2,2'-MDI, 2,4-toluene diisocyanate ("TDI"), 2,6-TDI, isomers of hexamethylene diisocyanate ("HDI"), and combinations of two or more thereof.

* * * * *